United States Patent
Noma et al.

(10) Patent No.: US 6,987,801 B2
(45) Date of Patent: Jan. 17, 2006

(54) MODEM APPARATUS, COMMUNICATION APPARATUS AND COMMUNICATION CONTROL METHOD

(75) Inventors: Nobuhiko Noma, Yokohama (JP); Mikio Mizutani, Tokyo (JP); Toshiyuki Ougi, Tokyo (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 838 days.

(21) Appl. No.: 09/811,609

(22) Filed: Mar. 20, 2001

(65) Prior Publication Data

US 2001/0026484 A1  Oct. 4, 2001

(30) Foreign Application Priority Data

Mar. 30, 2000  (JP) .............................. 2000-094259

(51) Int. Cl.
*H04B 1/38* (2006.01)
*H04L 5/16* (2006.01)

(52) U.S. Cl. ..................................................... 375/222
(58) Field of Classification Search ................ 375/222, 375/340, 316, 260
See application file for complete search history.

(56) References Cited

U.S. PATENT DOCUMENTS

| 6,279,022 B1 * | 8/2001 | Miao et al. ................. 708/404 |
| 6,519,291 B1 * | 2/2003 | Dagdeviren et al. ........ 375/260 |
| 6,785,349 B1 * | 8/2004 | Rosenlof et al. ............ 375/343 |

FOREIGN PATENT DOCUMENTS

| EP | 0876031 | 11/1998 |
| JP | 11275046 | 10/1999 |
| JP | 1-518742 | 10/2001 |
| WO | 99/17493 | 4/1999 |
| WO | 99/65180 | 12/1999 |

* cited by examiner

*Primary Examiner*—Mohammed Ghayour
*Assistant Examiner*—Krista Flanagan
(74) *Attorney, Agent, or Firm*—Greenblum & Bernstein, P.L.C.

(57) ABSTRACT

The present invention calculates a difference between present sampling data and sampling data one data unit ahead, cumulatively adds up difference values calculated for every sampling by going back to the time point ahead by the number of samples of a cyclic prefix signal inserted into an initializing signal and confirms the position of the cyclic prefix signal from the sample number for which this cumulative value indicates a minimum value.

8 Claims, 5 Drawing Sheets

MODEM APPARATUS, COMMUNICATION APPARATUS AND COMMUNICATION CONTROL METHOD

BACKGROUND OF THE INVENTION

1. Field of the Invention

The present invention relates to a modem apparatus using an xDSL technology that allows high-speed communications of several M bits/sec even with a telephone copper wire cable, and more particularly, to a modem apparatus, communication apparatus and communication control method that detect a CP (Cyclic Prefix) signal added to every data unit (a predetermined number of samples) of initializing signals.

2. Description of the Related Art

Against a background of the widespread proliferation of the Internet, there is a growing demand for high-speed access channels available for constant connection of the Internet. Furthermore, optical fibers are increasingly being introduced for use as the backbone of carriers and use of ultra high-speed channels of giga-bit class is beginning in their core sections. On the other hand, most of subscriber channels connecting user residences and a carrier station are copper wire cables installed for telephones. Therefore, the introduction of an xDSL technology, which allows high-speed communications of several M bits/sec with telephone copper wire cables, is under study.

One of the xDSL technologies is an ADSL system. The ADSL system uses carrier frequencies in a band of 35 kHz or higher, which is by far higher than the band used for telephones (4 kHz or below). For this reason, the ADSL system has an advantage of using telephone lines to carry out high-speed data communications without impairment of the telephone functions.

A voice modem using a band of 4 kHz or below sends a training signal prior to data transmission and then sends a data signal. An ADSL modem sends an initializing signal, which is equivalent to the training signal, and then sends a data signal.

FIG. 7 shows a sequence diagram of an initializing signal sent by the ADSL modem. As shown in FIG. 7, the initializing signal has a CP signal added at the beginning of every data unit (256 samples in the case of G.Lite) starting at some midpoint of the signal. The CP signal is configured by the same data as that of a predetermined number of samples (16 samples in the case of G.Lite) of the rear end of the data unit. That is, the 16 samples of the rear end of the data unit are copied and added at the beginning of the data unit, forming a unit of 272 samples (256+16) as a whole. Adding this CP signal at the beginning of every data unit also when a data signal is sent will prevent inter-code interference between data units. This also makes it possible to precisely demodulate a DMT (Discrete Multi Tone) modulated signal adopted by the ADSL system.

However, regardless of high-speed communication based on the ADSL system, the reception terminal cannot determine from which part of the initializing signal a cyclic insertion of the CP signal starts. For this reason, it is difficult to directly recognize the boundary between the CP signal and signal body. Here, the cyclic insertion refers to adding the rear 16 samples of the data unit at the beginning of the relevant data unit and repeating this procedure for every data unit.

SUMMARY OF THE INVENTION

It is an object of the present invention to provide a modem apparatus, communication apparatus and communication control method capable of accurately detecting a CP signal sent at some midpoint of an initializing signal without any detection error and precisely demodulating a DMT-modulated signal.

The present invention calculates a difference between present sampling data and sampling data one data unit ahead and cumulatively adds up the squares of the difference values calculated for every sampling by going back to the time point ahead by the number of samples of the CP signal inserted into the initializing signal and confirms the position of the CP signal from the sample number for which this addition value indicates a minimum value.

BRIEF DESCRIPTION OF THE DRAWINGS

The above and other objects and features of the invention will appear more fully hereinafter from a consideration of the following description taken in connection with the accompanying drawing wherein one embodiment is illustrated by way of example, in which.

DETAILED DESCRIPTION OF THE PREFERRED EMBODIMENTS

With reference now to the attached drawings, an embodiment of the present invention will be explained in detail below.

Figure 1:
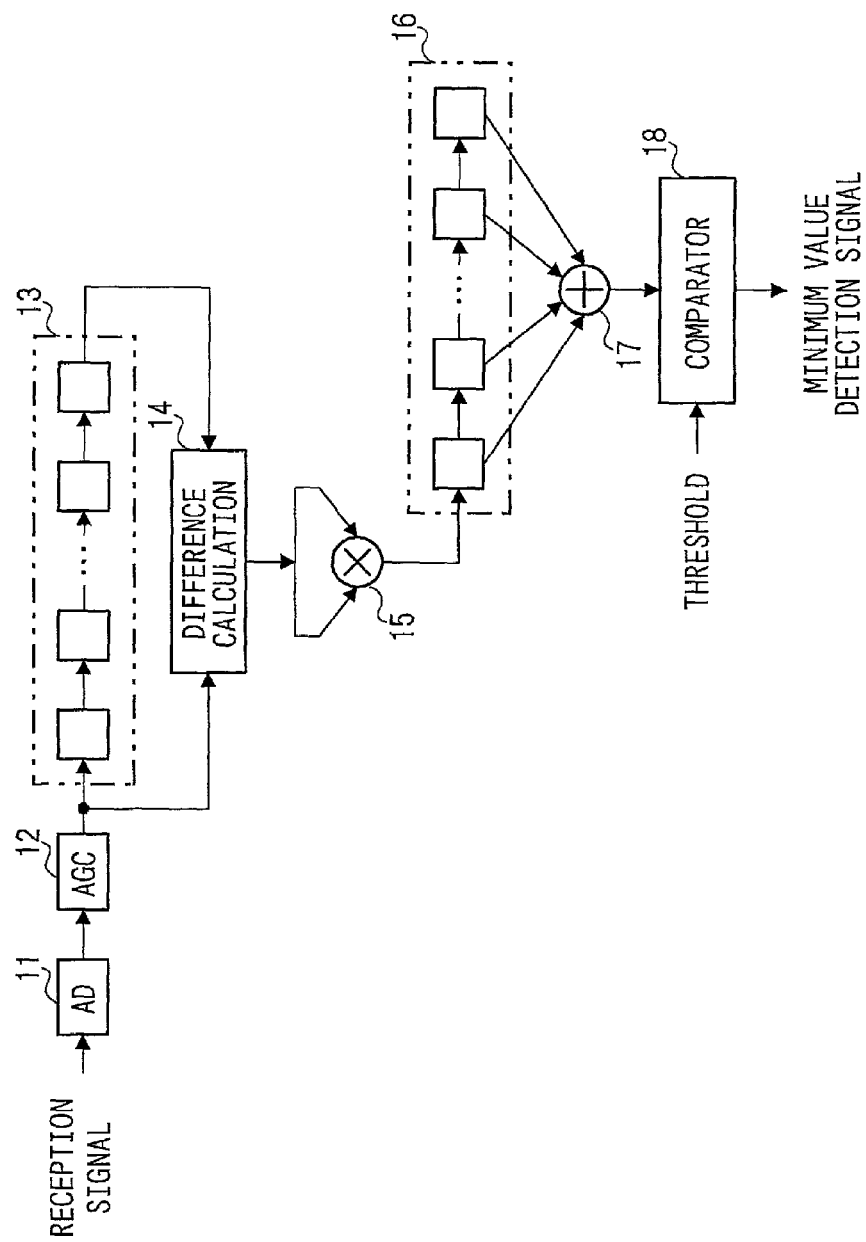
FIG. 1 is a functional block diagram of a reception system of a modem apparatus according to an embodiment of the present invention.

FIG. 1 is a functional block diagram of a reception system of a modem apparatus according to an embodiment of the present invention and is an excerpt of the part that detects a CP signal in an initializing signal. Before explaining the configuration of the part involved in the detection of the CP signal in this modem apparatus, an example of the channel connection mode constructed via this modem apparatus will be briefly explained with reference to FIG. 2.

A telephone station serving as a carrier station and a subscriber residence (user residence) are connected via copper wire cable 21. At the subscriber residence, telephone set 23 and ADSL terminal side apparatus 24 are connected via splitter 22. Furthermore, personal computer 26 as a communication terminal apparatus is connected to ADSL terminal side apparatus 24 via a local network such as 10-BASE-T. At the telephone station, exchange 28 and hub 29 (or router) are connected via ADSL station side apparatus 27.

When communication terminal apparatus 26 carries out a data communication, an initializing signal is sent/received between ADSL terminal side apparatus 24 and ADSL station side apparatus 27 at the telephone station. This embodiment will be explained assuming that this modem apparatus is mounted on ADSL terminal side apparatus 24 at the subscriber residence, but the modem apparatus can also be mounted on ADSL station side apparatus 27. Splitter 22 can be incorporated in ADSL terminal side apparatus 24 and no splitter is required in the case of G.Lite.

In FIG. 1, AD converter 11 samples a reception signal sent via copper wire cable 21 and outputs the sampling data to automatic gain controller 12. The sample data with gain adjusted by automatic gain controller 12 is input to first shift register 13 and difference calculator 14 in parallel.

First shift register 13 has a register length equivalent to the number of samples of one data unit. That is, in the case of G.Lite, first shift register 13 is configured by 256 delay elements. When certain sample data is input, first shift register 13 outputs the sample data 256 samples ahead to difference calculator 14. Therefore, difference calculator 14 calculates a difference between the sample data input this time and the sample data one data unit ahead (256 samples ahead in the case of G.Lite). The difference value output from difference calculator 14 is squared by multiplier 15 and input to second shift register 16.

Second shift register 16 has a register length corresponding to the number of samples that make up a CP signal and has taps to extract stored data from their respective delay elements. In this embodiment, a CP signal is configured by 16 sample data items, and therefore second shift register 16 is configured by 16 delay elements.

Adder 17 adds up the squares of 16 difference values stored in second shift register 16. This addition value is input to comparator 18. Comparator 18 compares the addition value with a threshold and outputs a minimum value detection signal when the addition value is smaller than the threshold. This minimum value detection signal becomes a candidate signal to indicate the position of the CP signal.

Figure 3:
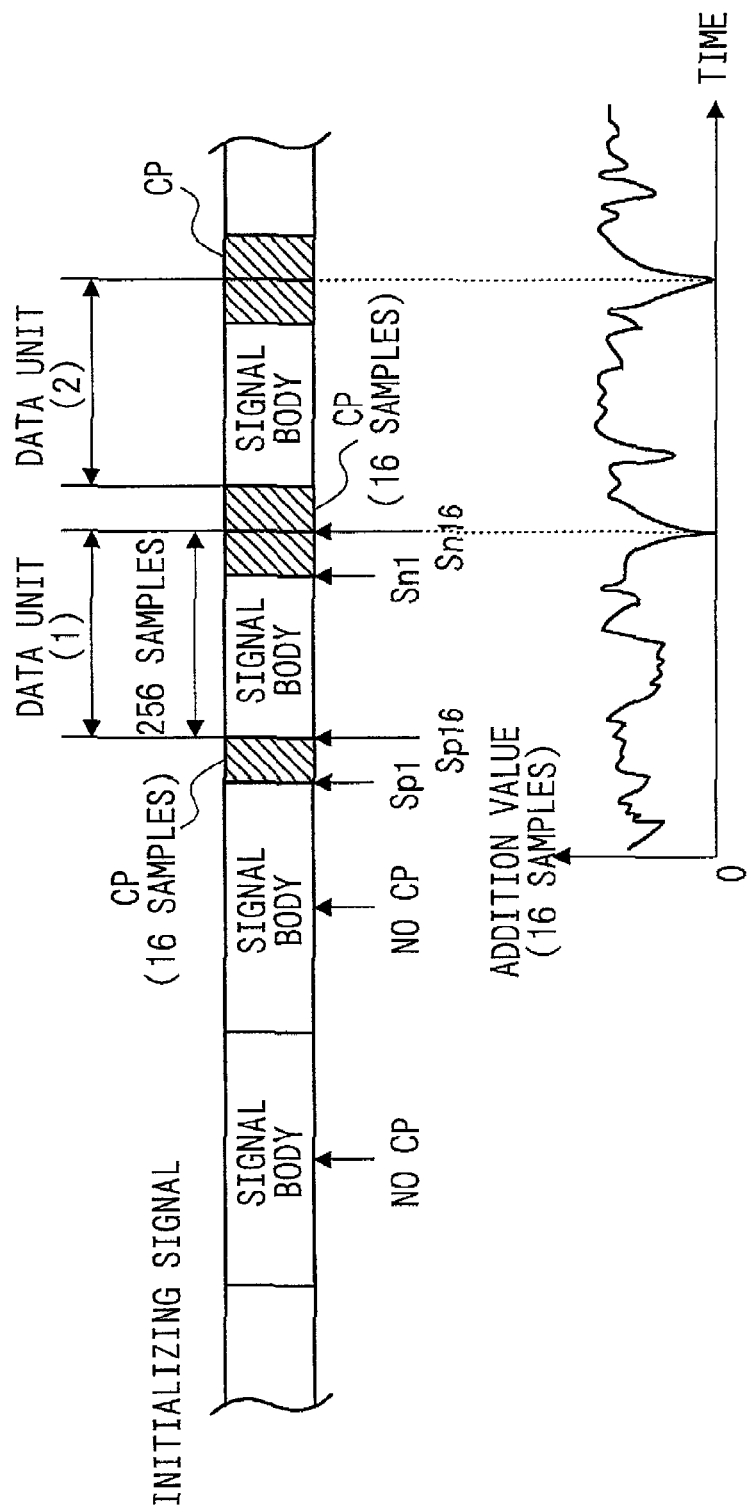
FIG. 3 illustrates a relationship between an initializing signal, the position of a CP signal and an addition value.

Here, an algorithm for detecting the CP signal from an initializing signal will be explained with reference to FIG. 3. FIG. 3 illustrates a relationship between an initializing signal and an addition value of adder 17. The explanation below will be focused on data unit (1) in FIG. 3.

Now, suppose the 16th sample data (Sn1) from the rear end of data unit (1) is input to first shift register 13. From first shift register 13, sample data (Sp1) 256 samples ahead of sample data (Sn1) is pushed out. As a result, sample data (Sp1) and sample data (Sn1) are simultaneously input to difference calculator 14 where their difference is calculated.

As described above, the CP signal corresponding to 16 samples (Sp1 to Sp16) added at the beginning of data unit (1) is the same data as the sample data (Sn1 to Sn16) of 16 samples of the last part of data unit (1). Therefore, when difference calculator 14 calculates the difference between the beginning data (Sp1) of the CP signal and the beginning data (Sn1) of the last part, the calculation result (difference value) would be ideally 0. However, in reality, two sample data items do not completely match because of influences of noise, etc. In any case, an extremely small value is input to second shift register 16.

As a result, the square of at least one difference value, which is extremely close to 0, is stored in second shift register 16. However, the squares of difference values stored ahead are likely to be non-zero values, and therefore the addition value output from adder 17 is a value considerably greater than 0.

Then, when the 15th sample data (Sn2) from the rear end of data unit (1) is input to first shift register 13, sample data one data unit ahead of sample data (Sn2) is pushed out from first shift register 13 and input to difference calculator 14. At this time, the sample data pushed out of first shift register 13 is sample data (Sp2), which is a copy of the 15th sample data (Sn2) from the rear end. Therefore, difference calculator 14 outputs the square of the difference value close to 0 again.

As a result, the square of the difference value close to 0 is input to second shift register 16 again, and therefore the addition value which adder 17 outputs is much smaller than the previous value. Thereafter, the squares of difference values close to 0 are input to second shift register 16 in the same way. Then, when the last sample data (S16) of data unit (1) is input to first shift register 13 and difference calculator 14, and the square of the difference value is stored in second shift register 16, the squares of difference values close to 0 are stored in all delay elements of second shift register 16. As a result, the addition value output from adder 17 at that time is the smallest value.

This state occurs every time the last sample data of each data unit is input. As shown in FIG. 3, the sample data next to the last sample data is the position of the first sample of the CP signal. Therefore, detecting the time point at which the output of adder 17 becomes virtually 0 makes it possible to detect the beginning position of the CP signal.

The square of the difference between the sample data (Sp1 to Sp16) of the CP signal and the last 16 samples (Sn1 to Sn16) of the data unit, which forms the basis of the CP signal, would be ideally 0, but slightly fluctuates depending on the channel condition. This embodiment determines a threshold capable of accurately detecting the adder output at all minimum value detection points from the adder output at minimum value detection points corresponding to a plurality of CP signals from the beginning of the initializing signal and sets this threshold in comparator 18.

When the adder output falls below the threshold, comparator 18 outputs a minimum value detection signal. The position of the CP signal is detected from this minimum value detection signal.

Figure 4:
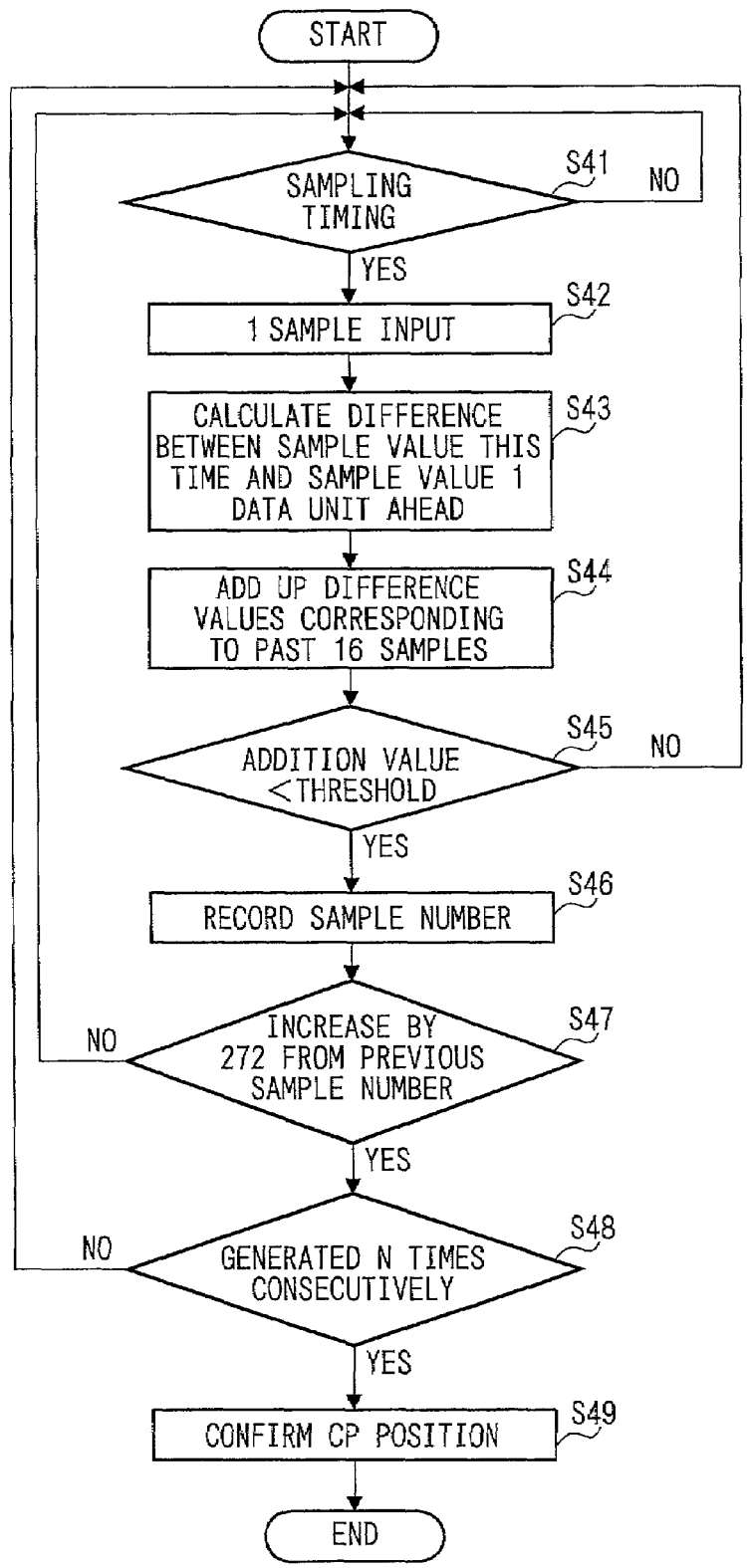
FIG. 4 is a flow chart for CP detection in the modem apparatus according to the embodiment above.
Figure 5:
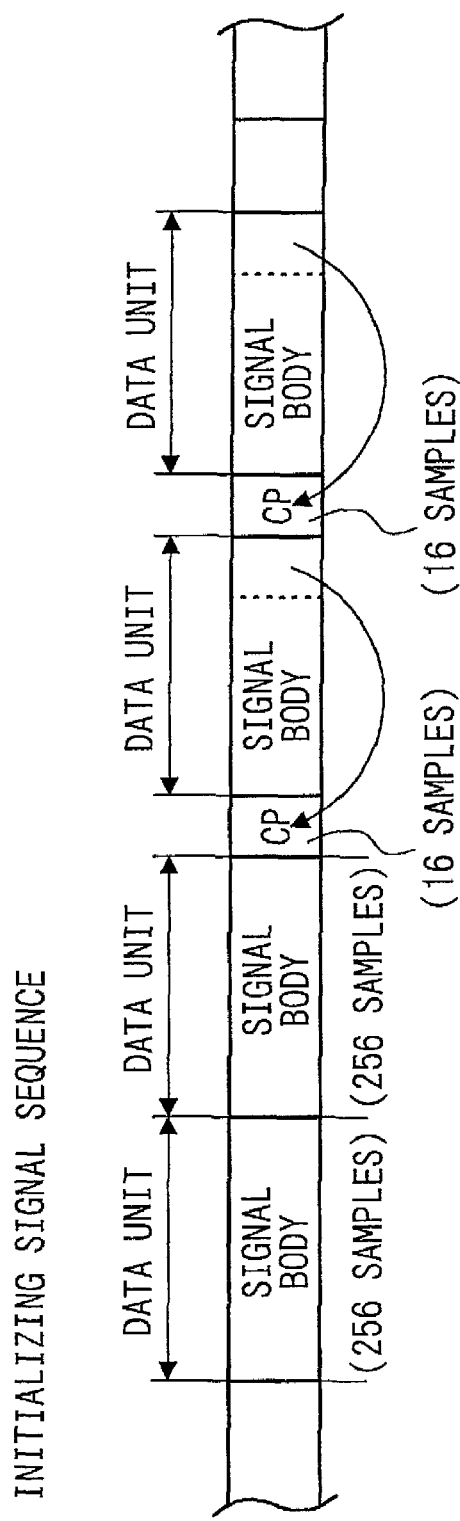
FIG. 5 is a data sequence diagram of an initializing signal.

FIG. 1 shows the hardware circuit to detect a CP signal in the modem apparatus above, but it is possible to execute the processing from AD converter 11 onward by software. FIG. 4 is a flow chart to execute CP detection processing in the modem apparatus above.

At a sampling time (S41), one sample is input (S42) and a difference between the sample data this time and sample data one data unit ahead is calculated (S43). Then, the squares of difference values corresponding to the past 16 samples are added up (S44) and the addition value is compared with a threshold (S45). The threshold can be obtained using the above-described method.

When the addition value is smaller than the threshold, the sample number of the sample data this time is stored (S46). Then, it is determined whether the sample number this time is ahead of the sample number stored previously by a predetermined number (number of samples of data unit+number of samples of CP signal) or not (S47). If the sample number this time is smaller than the predetermined number, the addition value is likely to have fallen below the threshold by accident, and therefore the process goes back to step S41. In this case, the sample number stored in step S46 is discarded.

From this, even if the addition value of the squares of difference values corresponding to the past 16 samples falls below the threshold at a position not corresponding to the beginning position of the CP signal (more accurately, the position one sample ahead), it is possible to prevent the position from being misjudged as the beginning position of the CP signal.

On the other hand, if the sample number this time has increased by a predetermined number in step S47, it is further determined the number of times the minimum value is detected and if predetermined number N is not reached yet, the process goes back to step S41 again. This makes it possible to confirm the CP position based on the results of a plurality of minimum value detections and thereby drastically improve the reliability compared to the case of confirming the CP position with only the first one minimum value detection.

Then, when the number of times a minimum value is detected reaches predetermined number N in step S48, the CP position is identified from the sample number at the minimum value detection points stored so far (S49).

After the CP signal position is identified as shown above, the data unit of the data signal sent after the initializing signal is extracted and demodulated with reference to the CP signal added at the beginning of the data unit.

Figure 2:
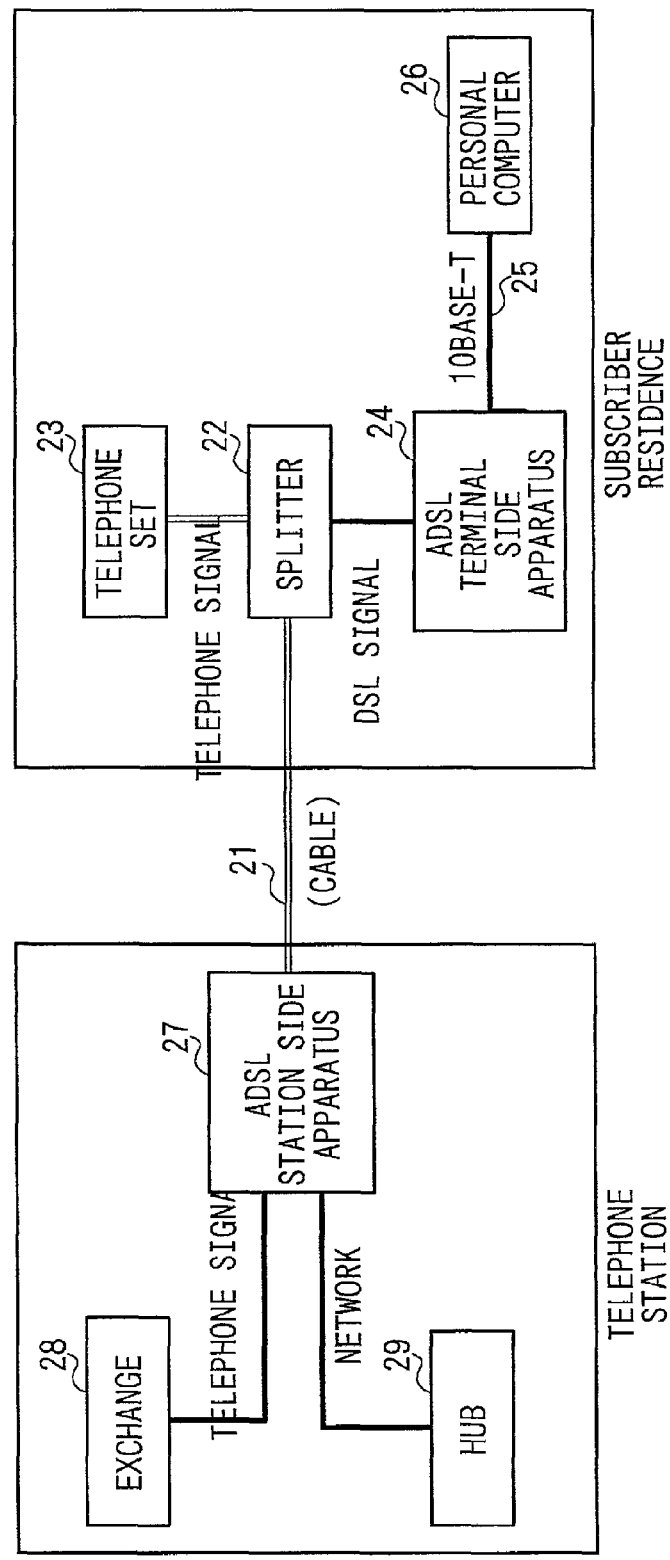
FIG. 2 illustrates a connection mode according to an ADSL system.

In the connection mode shown in FIG. 2, ADSL terminal side apparatus 24 is connected to communication terminal apparatus 26 via local network 25, but it is also possible to use a mode in which communication terminal apparatus 26 incorporates ADSL terminal side apparatus 24. Furthermore, communication terminal apparatus 26 is not limited to a personal computer, but can also be any other apparatus equipped with a facsimile apparatus (including Internet fax) and a communication function.

The present invention described above can provide a modem apparatus, communication terminal apparatus and communication control method capable of accurately detecting a CP signal sent at some midpoint of the initializing signal without any detection error and precisely demodulating a DMT-modulated signal.

The present invention is not limited to the above-described embodiments, and various variations and modifications may be possible without departing from the scope of the present invention.

This application is based on the Japanese Patent Application 2000-094259 filed on Mar. 30, 2000, entire content of which is expressly incorporated by reference herein.

What is claimed is:

1. A modem apparatus operating in accordance with an ADSL system comprising:
    a receiver configured to receive an initializing signal utilized for the ADSL system, the initializing signal including a first data unit without a cyclic prefix signal and a second data unit with the cyclic prefix signal, the second data unit being received following the first data unit, the cyclic prefix signal being in front of the second data unit and comprising a same data as data of a data unit portion at a rear of the second data unit;
    a sampler configured to sample the received initializing signal in units of a predetermined number of samples, the predetermined number of samples corresponding to one data unit;
    a difference calculator configured to calculate a difference between a sample of a present data unit and a sample spaced from the present sample by the predetermined number of samples;
    a multiplier configured to square the difference calculated by the difference calculator;
    a storage device configured to store a predetermined number of squared difference values, the predetermined number of the squared difference values corresponding to the sampling number of the cyclic prefix signal;
    an adder configured to sum the squared difference values stored in the storage device; and
    a controller configured to compare the summed value with a predetermined threshold value, to determine that the cyclic prefix signal is detected when the summed value is smaller than the predetermined threshold value, and to detect the second data unit in the initializing signal, based on the detection of the cyclic prefix signal.

2. The modem apparatus according to claim 1, wherein the controller determines that the cyclic prefix signal is detected, when a second summed value is smaller than the predetermined threshold value after it is determined that a first summed value is smaller than the predetermined threshold value and when an interval between the determinations of the first summed value and the second summed value corresponds to the predetermined number of samples.

3. The modem apparatus according to claim 1, wherein the controller further counts the number of times that the summed value is smaller than the predetermined threshold value, and determines that the cyclic prefix signal is detected when the counted number of times reaches a predetermined number.

4. The modem apparatus according to claim 1, wherein the predetermined threshold value is close to zero.

5. An ADSL terminal side apparatus equipped with the modem apparatus according to claim 1.

6. An ADSL station side apparatus equipped with the modem apparatus according to claim 1.

7. A communication apparatus equipped with the modem apparatus according to claim 1.

8. A communication control method comprising:
    receiving an initializing signal utilized for an ADSL system, the initializing signal including a first data unit without a cyclic prefix signal and a second data unit with the cyclic prefix signal, the second data unit being received following the first data unit, the cyclic prefix signal being in front of the second data unit and comprising a same data as data of a data unit portion at a rear of the second data unit;
    sampling the received initializing signal in units of a predetermined number of samples, the predetermined number of samples corresponding to one data unit;
    calculating a difference between a sample of a present data unit and a sample spaced from the present sample by the predetermined number of samples;
    squaring the calculated difference;
    storing a predetermined number of squared difference values, the predetermined number of the squared difference values corresponding to the sampling number of the cyclic prefix signal;
    summing the stored difference values;
    comparing the summed value with a predetermined threshold value;
    determining that the cyclic prefix signal is detected, when the summed value is smaller than the predetermined threshold value; and
    detecting the second data unit in the initializing signal, based on the detection of the cyclic prefix signal.

* * * * *